United States Patent
Fatemi et al.

(10) Patent No.: US 12,451,781 B2
(45) Date of Patent: Oct. 21, 2025

(54) HYBRID EXCITED ROTARY MACHINE

(71) Applicant: GM Global Technology Operations LLC, Detroit, MI (US)

(72) Inventors: Alireza Fatemi, Canton, MI (US); Alan G. Holmes, Clarkston, MI (US); Shawn H. Swales, Canton, MI (US); Mazharul Chowdhury, Canton, MI (US); Muhammad Hussain Alvi, Troy, MI (US); Peng Peng, Columbus, OH (US); Thomas W. Nehl, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 229 days.

(21) Appl. No.: 18/336,202

(22) Filed: Jun. 16, 2023

(65) Prior Publication Data

US 2024/0421681 A1    Dec. 19, 2024

(51) Int. Cl.
*H02K 21/04* (2006.01)
*B60L 53/22* (2019.01)
(Continued)

(52) U.S. Cl.
CPC ............ *H02K 21/042* (2013.01); *B60L 53/22* (2019.02); *B60L 2210/40* (2013.01)

(58) Field of Classification Search
CPC ...... H02K 21/042; H02K 21/46; H02K 21/04; H02K 1/276; H02K 1/223; B60L 53/22; B60L 2210/40
(Continued)

(56) References Cited

U.S. PATENT DOCUMENTS

| 1,224,518 | A | * | 5/1917 | Apple | ............. | H02K 13/04 |
| | | | | | | 310/233 |
| 4,311,932 | A | * | 1/1982 | Olson | ............. | H02K 9/19 |
| | | | | | | 310/59 |

(Continued)

FOREIGN PATENT DOCUMENTS

| CH | 137853 | A | * | 1/1930 | ............. | 310/211 |
| DE | 3609750 | A1 | * | 9/1987 | ............. | H02K 21/46 |

(Continued)

OTHER PUBLICATIONS https://en.wikipedia.org/wiki/Direct_coupling Accessed Mar. 26, 25 (Year: 2025).*

*Primary Examiner* — Burton S Mullins
(74) *Attorney, Agent, or Firm* — CANTOR COLBURN LLP

(57) ABSTRACT

A vehicle's electrified powertrain includes a battery pack linked to a traction power inverter module (TPIM) converting DC voltage from the battery pack into AC voltage. A rotary electric machine includes a stator energized by the TPIM's AC voltage, enclosing a rotor core capable of rotation. The rotor core contains slots holding conductive bars and permanent magnets, with conductive bars positioned closer to the rotor core's center. The conductive bars and permanent magnets are separated by gaps within each slot. An annular end ring assembly is present at one end of the rotor core, featuring terminal conductors connected to subsets of conductive bars and a secondary coil of a rotary transformer. When the stator is energized, the rotor shaft, connected to the rotor, rotates. The electric machine powers a transmission, which is coupled to the rotor shaft.

16 Claims, 5 Drawing Sheets

(51) Int. Cl.
  *H02K 1/22*   (2006.01)
  *H02K 1/27*   (2022.01)
  *H02K 21/46*  (2006.01)

(58) Field of Classification Search
  USPC ............ 310/156.07, 156.81, 179, 201, 212
  See application file for complete search history.

(56) References Cited

U.S. PATENT DOCUMENTS

| | | | | |
|---|---|---|---|---|
| 4,454,438 A * | 6/1984 | Yamashita | ............ | H02K 21/14 310/211 |
| 4,742,258 A * | 5/1988 | Earle | ............ | H02K 21/042 310/156.53 |
| 5,548,172 A * | 8/1996 | Kliman | ............ | H02K 21/46 310/156.53 |
| 5,640,064 A * | 6/1997 | Boyd, Jr. | ............ | H02K 5/225 310/216.069 |
| 5,663,605 A * | 9/1997 | Evans | ............ | H02K 21/04 310/263 |
| 5,758,709 A * | 6/1998 | Boyd, Jr. | ............ | H02K 17/18 164/109 |
| 7,173,358 B2 * | 2/2007 | Drubel | ............ | H02K 3/24 310/201 |
| 8,319,388 B2 * | 11/2012 | Yoshino | ............ | H02K 17/18 310/212 |
| 9,048,714 B2 * | 6/2015 | Huth | ............ | H02K 1/278 |
| 9,160,218 B2 * | 10/2015 | Matt | ............ | H02K 21/042 |
| 9,780,715 B2 * | 10/2017 | Sudhoff | ............ | H02K 21/042 |
| 10,269,479 B2 * | 4/2019 | Simon | ............ | B33Y 80/00 |
| 11,398,346 B2 * | 7/2022 | Scherf | ............ | H01F 41/0253 |
| 11,764,657 B2 * | 9/2023 | Hidaka | ............ | H02K 1/223 310/156.07 |
| 2007/0040466 A1 * | 2/2007 | Vollmer | ............ | H02K 17/18 310/212 |
| 2014/0265702 A1 * | 9/2014 | Li | ............ | H02K 1/276 310/156.38 |
| 2018/0254688 A1 * | 9/2018 | Gieras | ............ | H02K 21/042 |

FOREIGN PATENT DOCUMENTS

PL        239127 B1 * 11/2021 ............ H02K 21/46
WO   WO-2015183379 A1 * 12/2015 ............ H02K 1/02

* cited by examiner

HYBRID EXCITED ROTARY MACHINE

INTRODUCTION

The disclosure relates to rotary electric machines. More particularly, the disclosure relates to hybrid excited (HE) rotary machines combining permanent-magnet (PM) excitation and field excitation.

HE machines advantageously provide two sources of rotor magnetic fields. The rotor in such machines may typically include field coils wound from small gauge wires thus limiting the fill factor and adding complexity to rotor manufacturing. HE machines may exhibit relatively high heat and potential for heat induced demagnetization and decreasing field strength of the permanent magnets due in part to the additional copper loss characteristics of field coils.

HE machines having a high fill factor, simpler manufacturing and heat tolerance characteristics are desirable.

SUMMARY

In one exemplary embodiment, an electric machine may include a stator and a rotor core surrounded by the stator and rotatable about an axis, the rotor core having axially opposite ends and a plurality of slots, each slot extending through the rotor core between the axially opposite ends and containing at least one respective electrical conductor and at least one respective permanent magnet, wherein the electrical conductors are radially inboard relative to the permanent magnets and extend beyond the axially opposite ends of the rotor core.

In addition to one or more of the features described herein, the electrical conductors may include conductive bars.

In addition to one or more of the features described herein, the conductive bars may include hairpin conductors.

In addition to one or more of the features described herein, the at least one respective electrical conductor and the at least one respective permanent magnet contained within each slot may be separated by a respective space.

In addition to one or more of the features described herein, the at least one respective permanent magnet contained within each slot may include a stack of permanent magnets.

In addition to one or more of the features described herein, the at least one respective permanent magnet contained within each slot may include a respective first magnet and a respective second magnet, wherein the first magnets are intermediate the second magnets and the electrical conductors, the first magnets have a first temperature rating and the second magnets have a second temperature rating that is less than the first temperature rating.

In addition to one or more of the features described herein, the at least one respective permanent magnet contained within each slot may include a respective first magnet and a respective second magnet, wherein the first magnets are intermediate the second magnets and the electrical conductors, the first magnets have a first coercivity and the second magnets have a second coercivity that is less than the first coercivity.

In addition to one or more of the features described herein, the spaces separating the electrical conductors and the permanent magnets may include cooling passages within the rotor core.

In addition to one or more of the features described herein, the spaces separating the electrical conductors and the permanent magnets may contain a thermal insulator.

In addition to one or more of the features described herein, the conductive bars may be hollow.

In addition to one or more of the features described herein, the slots may be open at a periphery of the rotor core sufficient for radial insertion of the electrical conductors.

In addition to one or more of the features described herein, the electric machine may further include a cylindrical containment sleeve surrounding the rotor core at a periphery of the rotor core.

In addition to one or more of the features described herein, the electric machine may further include an annular end ring assembly at one end of the rotor core containing a first terminal conductor galvanically coupled to a first subset of the conductive bars and a second terminal conductor galvanically coupled to a second subset of the conductive bars.

In addition to one or more of the features described herein, the annular end ring assembly may further contain a secondary coil of a rotary transformer.

In addition to one or more of the features described herein, the annular end ring assembly may radially surround the conductive bars where they extend beyond the one end of the rotor core.

In addition to one or more of the features described herein, the annular end ring assembly may be radially surrounded by the conductive bars where they extend beyond the one end of the rotor core.

In another exemplary embodiment, an electric machine may include a stator, a rotor core surrounded by the stator and rotatable about an axis, the rotor core having axially opposite ends and a plurality of slots, each slot extending through the rotor core between the axially opposite ends and containing at least one respective conductive bar and at least one respective permanent magnet, wherein the conductive bars are radially inboard relative to the permanent magnets and extend beyond the axially opposite ends of the rotor core, and wherein the at least one respective conductive bar and at the least one respective permanent magnet contained within each slot are separated by a respective space, and an annular end ring assembly at one end of the rotor core containing a first terminal conductor galvanically coupled to a first subset of the conductive bars and a second terminal conductor galvanically coupled to a second subset of the conductive bars.

In addition to one or more of the features described herein, the annular end ring assembly may further contain a secondary coil of a rotary transformer.

In addition to one or more of the features described herein, the at least one respective permanent magnet contained within each slot may include a respective first magnet and a respective second magnet, wherein the first magnets are intermediate the second magnets and the conductive bars, the first magnets have a first coercivity and the second magnets have a second coercivity that is less than the first coercivity.

In yet another exemplary embodiment, an electrified powertrain for a vehicle may include a battery pack, a traction power inverter module ("TPIM") connected to the battery pack, and configured to change a direct current ("DC") voltage from the battery pack to an alternating current ("AC") voltage, and a rotary electric machine, including a stator energized by the AC voltage from the TPIM, a rotor core surrounded by the stator and rotatable about an axis, the rotor core having axially opposite ends and a plurality of slots, each slot extending through the rotor core between the axially opposite ends and containing at least one respective conductive bar and at least one respective permanent magnet, wherein the conductive bars are radially inboard relative to the permanent magnets and extend beyond the axially opposite ends of the rotor core, and wherein the at least one respective conductive bar and the at least one respective permanent magnet contained within each slot are separated by a respective space, and an annular end ring assembly at one end of the rotor core containing a first terminal conductor galvanically coupled to a first subset of the conductive bars and a second terminal conductor galvanically coupled to a second subset of the conductive bars, the annular end ring assembly further containing a secondary coil of a rotary transformer for energizing the conductive bars, a rotor shaft connected to the rotor, and configured to rotate about an axis of rotation in conjunction with the rotor when the stator is energized, and a transmission coupled to the rotor shaft and powered by the electric machine.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference labels indicate like or corresponding parts and features. Description of parts and features in one drawing is understood to apply to parts and features in other drawings sharing the same reference labels to the extent such parts and features are not otherwise distinguishable through drawing examination by one having ordinary skill in the art or distinguished by additional written description herein.

Figure 1:
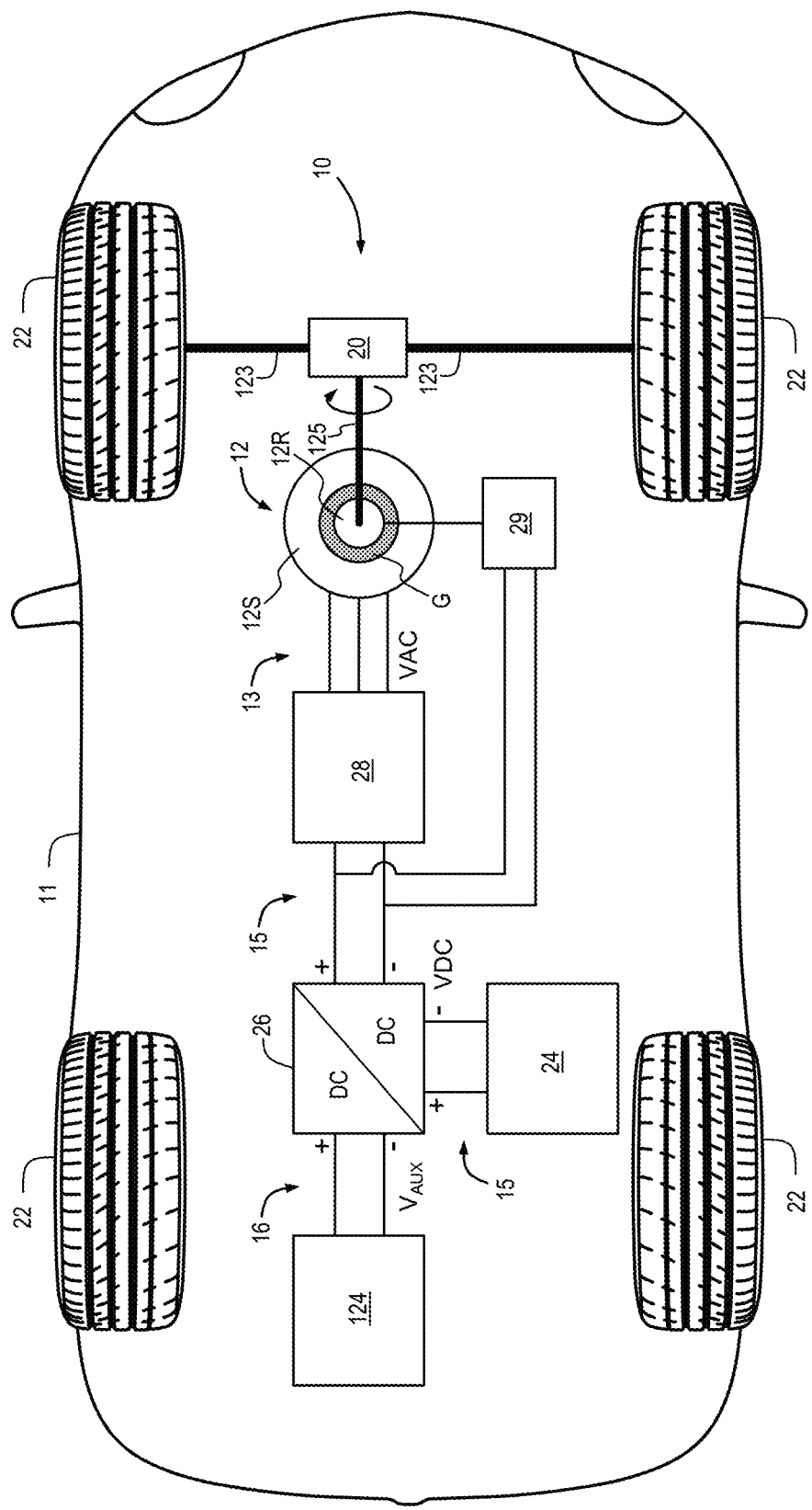
FIG. 1 illustrates an electrified powertrain, in accordance with one or more embodiments.

Referring to the drawings, wherein like reference numbers refer to the same or like components in the several FIGS., an electrified powertrain 10 is depicted schematically in FIG. 1, (e.g., for use aboard an exemplary motor vehicle 11.) The powertrain 10 includes a rotary electric machine 12 having a rotor 12R and a stator 12S. The rotor 12R may include interior permanent magnets and direct current (DC) field windings as sources of rotor magnetic fields. When the stator 12S is energized, the rotor 12R supplies motor torque to a transmission 20, (e.g., a stepped-gear automatic transmission.) Although omitted for illustrative simplicity, the electrified powertrain 10 may also include an internal combustion engine configured to generate engine torque. When so equipped, the generated engine torque may be selectively provided to the transmission 20, either alone or in conjunction with the motor torque from the electric machine 12.

When the vehicle 11 of FIG. 1 is embodied as a hybrid electric vehicle, the electric machine 12 and/or the engine may power the transmission 20. Alternatively, the vehicle 11 may be a battery electric vehicle, in which case the transmission 20 may be powered solely by the motor torque from the electric machine 12. The disclosed improvements relate to the construction of the electric machine 12, and may be realized in hybrid electric vehicle (HEV) and electric vehicle (EV) embodiments of the vehicle 11 without limitation, as well as in non-vehicular applications such as power plants, hoists, mobile platforms and robots, etc.

With continued reference to the exemplary vehicle 11 of FIG. 1, the electrified powertrain 10 may include an alternating current (AC) voltage bus 13. The AC voltage bus 13 may be selectively energized via a traction power inverter module (TPIM) 28 that is DC coupled to a high-voltage (HV) battery pack 24, for instance a lithium ion, lithium sulfur, nickel metal hydride, or other high-energy voltage supply. The AC voltage bus 13 provides an AC bus voltage (VAC) and conducts AC current to or from the electric machine 12. The motor torque from the energized electric machine 12, when operating in a drive or motoring mode, is imparted to a rotor shaft 12S of the rotor 12R, with the rotor shaft 12S journaled, splined, or otherwise connected to the rotor 12R. The motor torque is then directed to a coupled load, such as the transmission 20 and/or one or more road wheels 22.

The HV battery pack may be DC coupled to the TPIM 28 via a relatively high DC voltage bus (e.g., DC link) 15 at a relatively high DC voltage (VDC). The electrified powertrain 10 may also include a DC-DC converter 26 configured to reduce or increase a relatively high DC bus voltage VDC as needed. The DC-DC converter 26 is connected between the battery pack 24 and a relatively low DC voltage bus 16. In some configurations, an auxiliary battery pack 124 may be connected to the DC-DC converter 26 across the relatively low DC voltage bus 16. The auxiliary battery pack 124 may be embodied as a lead-acid battery or a battery constructed of another application-suitable chemistry and configured to store or supply, for example, a 12-15V auxiliary voltage ($V_{AUX}$) to one or more connected auxiliary devices (not shown).

The rotor 12R of the electric machine 12 is positioned adjacent to the stator 12S and separated therefrom by an airgap. The stator 12S and the rotor 12R may be constructed from a stack-up of thin laminations, (e.g., electrical steel or another ferrous material, with each lamination typically being about 0.2 mm-0.5 mm thick as will be appreciated by those of ordinary skill in the art.) Laminations may be cut to their finished shape by a punch and die or may be cut by a laser, or by wire electrical discharge machining.

The rotor 12R shown schematically in FIG. 1 includes internal rotor slots characterized by voids in the electrical steel of the laminations. Such rotor slots may provide a flux barrier internal to the rotor 12R and may contain other rotor features as further described herein. In accordance with certain embodiments, the rotor slots may be partially or completely filled with a combination of permanent magnets (PM) and electrical conductors. The electrical conductors of the rotor 12R operate as field windings to strategically produce magnetic fields within the rotor 12R. The electrical conductors may be energized by a DC power source, for example from the high DC voltage bus 15 via a rotary transformer 29.

Figure 2:
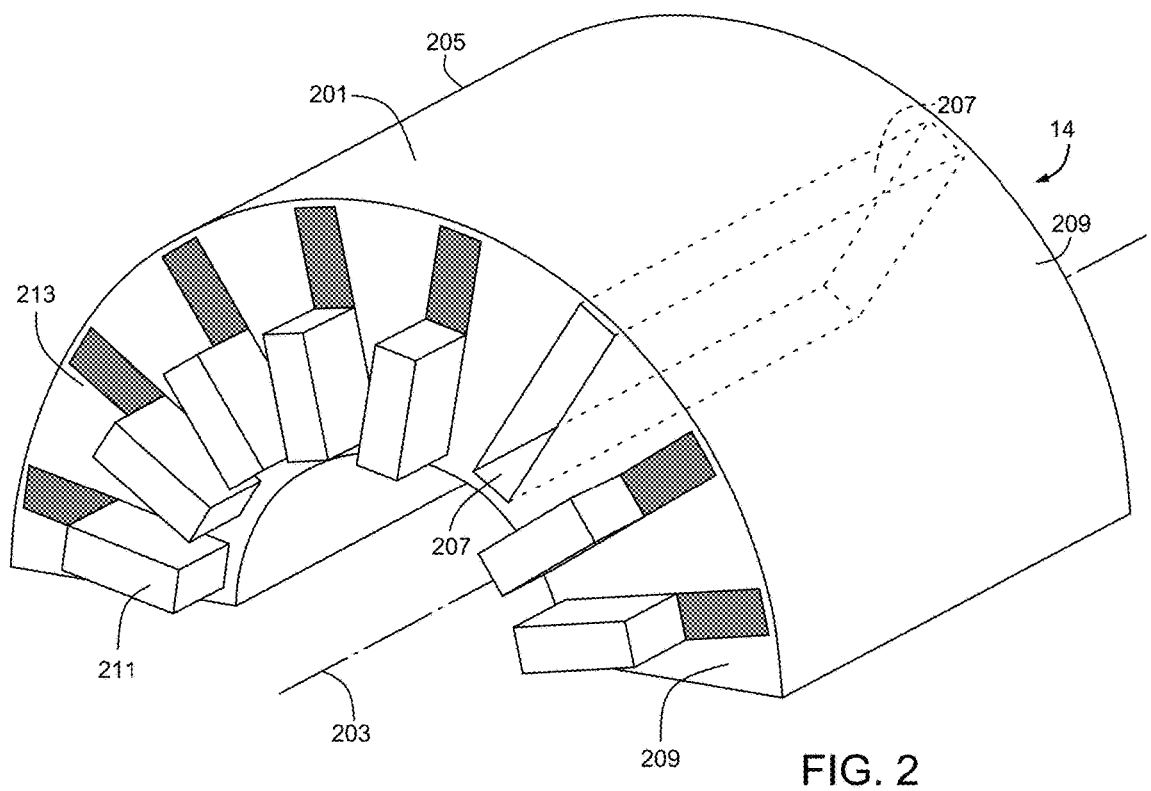
FIG. 2 illustrates various features of a hybrid electric machine rotor, in accordance with one or more embodiments.

FIG. 2 depicts an exemplary rotor core 201 of the rotor 12R of FIG. 1 in accordance with a hybrid excited (HE) rotary machine. The depiction in FIG. 2 is representative of one-half of a rotor core 201 divided through the rotational axis 203 of the rotor 12R for illustrative simplicity and clarity. The rotor core 201 may be constructed from a stack-up of thin laminations, (e.g., electrical steel or another ferrous material, with each lamination typically being about 0.2 mm-0.5 mm thick as will be appreciated by those of ordinary skill in the art.) Laminations may be cut to their finished shape by a punch and die or may be cut by a laser, or by wire electrical discharge machining. The rotor core 201 may be alternatively fabricated, for example mold formed from sintered powdered metal and binders under heat and pressure. The stator according to a non-limiting exemplary embodiment is arranged concentrically around the rotor 12R such that the rotor 12R is surrounded by the stator 12S. In such an embodiment, the airgap G is a radial airgap and the electric machine 12 embodies a radial flux-type machine. However, other embodiments may be realized in which the relative positions of the rotor 12R and stator 12S are reversed. For illustrative consistency, the embodiment of FIG. 1 in which the rotor 12R resides radially within the stator 12S will be described herein without limiting the construction to such a configuration.

The stator 12S of FIG. 1 is not illustrated in further detail but may include radially-projecting stator teeth extending inward from a cylindrical stator core. That is, the stator teeth extend toward the rotor 12R from the stator core. The inner diameter surface of the stator 12S is the radially-innermost surface of the stator teeth facing or opposing the outer peripheral surface 205 of the rotor 12R in spaced adjacency to form the air gap G (see FIG. 1). Adjacent stator teeth are separated from each other by a corresponding stator slot, as will be appreciated by those of ordinary skill in the art. The stator slots enclose electrical conductors, typically copper wires, copper bars, or hairpin conductor. Such conductors collectively form stator windings. A rotating stator magnetic field is generated when the stator windings are sequentially-energized by a polyphase output voltage from the TPIM 28 of FIG. 1. Stator magnetic poles formed from the resulting rotating stator magnetic field interact with rotor poles to rotate the rotor 12R around the rotational axis 203.

In the HE rotary machine embodiment of FIG. 2, the rotor core 201 may include a number of slots 207 extending axially through the rotor core 201 between opposite ends 209 of the rotor core 201. The slots may be substantially aligned axially between the opposite ends 209 of the rotor core though the actual alignment may be skewed as is known in the art. The slots 207 may be substantially radially aligned though the actual alignment may be offset from a true radial alignment as is known in the art. Reference herein to radial alignment or substantial radial alignment of slots, permanent magnets or electrical conductors is understood to refer to true radial alignment or a skewed radial alignment as known to those skilled in the art. In an embodiment, each slot 207 may contain an electrical conductor 211 and a permanent magnet 213. The permanent magnets 213 may be continuous or segmented through the axial length of the slots 207. The electrical conductors 211 are continuous through the axial length of the slots 207 and may extend axially beyond the opposite ends 209 of the rotor core 201 as illustrated at one end 209 of FIG. 2. The electrical conductors 211 and the permanent magnets 213 are arranged within the slots 207 such that the electrical conductors 211 are beneath or radially inboard relative to the permanent magnets 213.

The permanent magnets 213 may be collectively referred to herein as rotor magnets and may be constructed, for example, of ferrite, Neodymium-iron-boron, Samarium cobalt, aluminum-nickel-cobalt, etc., or another application-suitable material as may be discussed in further detail herein. The rotor magnets in such embodiment are embedded within respective slots 207 within the stack of individual steel laminations of the rotor core 201. The number, type, position, and/or relative orientation of the rotor magnets ultimately influences the magnitude and distribution of magnetic flux in the ferrous materials of the electric machine 12. Also, when viewed axially (e.g., FIGS. 3A and 3B) the rotor magnets may be evenly distributed circumferentially. In an embodiment, the poles of the rotor magnets may be axially aligned. In an embodiment, the poles of the rotor magnets may be circumferentially aligned. In an embodiment, the poles of the rotor magnets may be radially aligned.

Figure 3A:
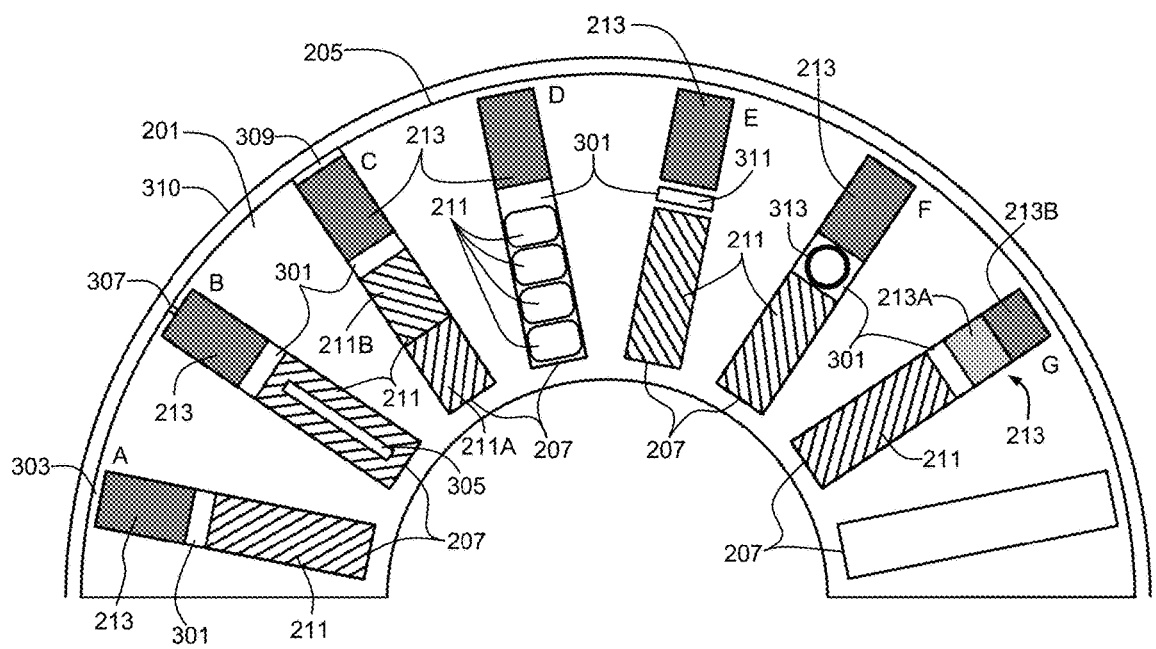
FIGS. 3A and 3B illustrate various features of a hybrid electric machine rotor, in accordance with one or more embodiments.
Figure 3B:
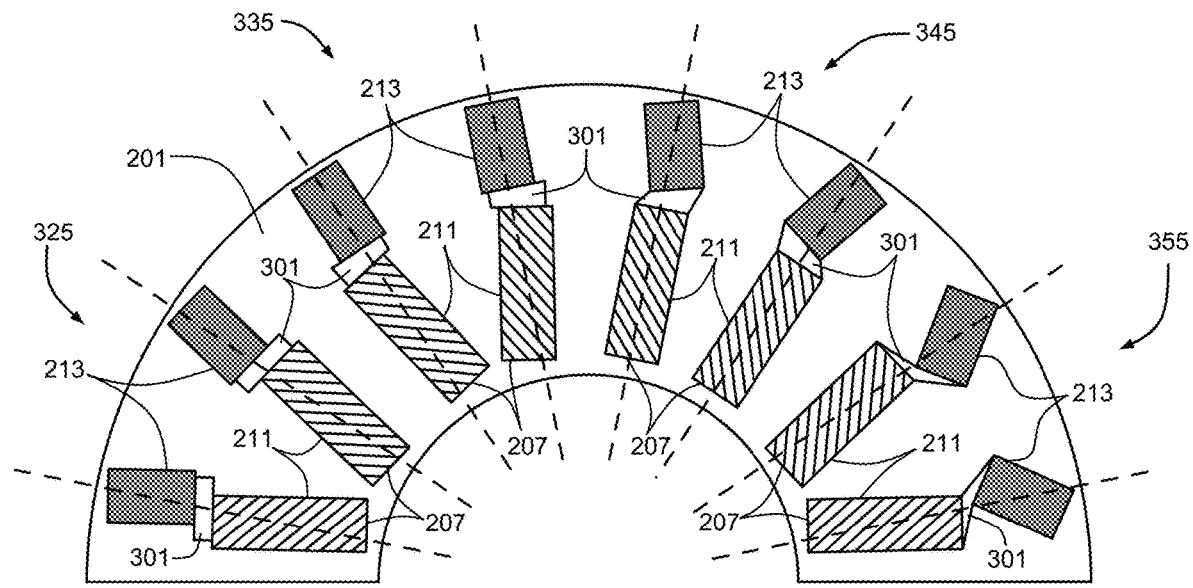

FIGS. 3A and 3B depict an end view of the rotor core observed along the rotational axis 203 illustrated in FIG. 2. FIGS. 3A and 3B illustrate a number of diverse embodiments of slot 207 structures, electrical conductors 211 and permanent magnets 213. FIG. 3A primarily depicts exemplary embodiments of different electrical conductor 211 and permanent magnet 213 arrangements aligned within true radially aligned slots 207. FIG. 3B primarily depicts exemplary embodiments of different radial and skewed-radial slots 207 and alignments of electrical conductor 211 and permanent magnet 213.

In FIG. 3A, slot positions are labeled A through G merely for ease of referencing the diverse exemplary embodiments. Beginning with slot position A, the slot 207 contains an arrangement of a permanent magnet 213 and an electrical conductor 211 radially inboard of the permanent magnet 213. A space 301 separates the permanent magnet 213 and the electrical conductor 211. The electrical conductor 211 is shown as a single conductive bar. The conductive bar may be any suitable conductor such as, but not limited to, copper, aluminum or brass. Conductive bars may be fabricated using any suitable process including, but not limited to, stamping, rolling, laser cutting, casting, extruding, etc. In the embodiment at slot position A, the conductive bar is solid. The space 301 may be an air gap, or may be filled with an insulator such as, but not limited to, mineral wool or polyurethane. The space 301 may also provide a channel for circulating a pressurized coolant such as lubricating oil or air. The slot 207 at position A is a closed slot having a bridge 303 of rotor core 201 material at the outer peripheral surface 205 of the rotor core 201. The bridge 303 in the embodiment at slot position A may preclude radial insertion of the electrical conductor 211 and the permanent magnet 213, thus limiting rotor core 201 fabrication to axial insertion.

At slot position B, the slot 207 contains an arrangement of a permanent magnet 213 and an electrical conductor 211 radially inboard of the permanent magnet 213. A space 301 separates the permanent magnet 213 and the electrical conductor 211. The electrical conductor 211 is shown as a single conductive bar. The conductive bar may be any suitable conductor such as, but not limited to, copper, aluminum or brass. Conductive bars may be fabricated using any suitable process including, but not limited to, stamping, rolling, laser cutting, casting, extruding, etc. In the embodiment at slot position B, the conductive bar is hollow having a central channel 305 therethrough. The channel may carry a pressurized coolant such as lubricating oil or air. The space 301 may be an air gap, or may be filled with an insulator such as, but not limited to, mineral wool or polyurethane. The space 301 may also provide a channel for circulating a coolant such as a lubricating oil. The slot 207 at position B is an open slot having a break 307 in the bridge of rotor core 201 material at the outer peripheral surface 205 of the rotor core 201. The break 307 in the embodiment at slot position B may be too small for radial insertion of the electrical conductor 211 and the permanent magnet 213, thus limiting rotor core 201 fabrication to axial insertion.

At slot position C, the slot 207 contains an arrangement of a permanent magnet 213 and an electrical conductor 211 radially inboard of the permanent magnet 213. A space 301 separates the permanent magnet 213 and the electrical conductor 211. The electrical conductor 211 is shown as a first conductive bar 211A and a second conductive bar 211B. The conductive bars may be any suitable conductor such as, but not limited to, copper, aluminum or brass. Conductive bars may be fabricated using any suitable process including, but not limited to, stamping, rolling, laser cutting, casting, extruding, etc. In the embodiment at slot position C, the conductive bars are solid. The space 301 may be an air gap, or may be filled with an insulator such as, but not limited to, mineral wool or polyurethane. The space 301 may also provide a channel for circulating a coolant such as a lubricating oil. The slot 207 at position C is an open slot having a break 309 in the bridge of rotor core 201 material at the outer peripheral surface 205 of the rotor core 201. The break 309 in the embodiment at slot position C may be large enough for radial insertion of the electrical conductor 211 and the permanent magnet 213. In an embodiment, a non-magnetic, cylindrical sleeve 310 may surround the rotor core 201 when the break 309 provides no retention features over the permanent magnets 213.

At slot position D, the slot 207 contains an arrangement of a permanent magnet 213 and an electrical conductor 211 radially inboard of the permanent magnet 213. A space 301 separates the permanent magnet 213 and the electrical conductor 211. The electrical conductor 211 is shown as a plurality of electrical conductors 211 such as hairpin conductors. The hairpin conductors may be any suitable conductor such as, but not limited to, copper, aluminum or brass. Hairpin conductors may be fabricated using any suitable process including, but not limited to, extruding, and shape forming, etc. In the embodiment at slot position D, the hairpin conductors are solid. The space 301 may be an air gap, or may be filled with an insulator such as, but not limited to, mineral wool or polyurethane. The space 301 may also provide a channel for circulating a coolant such as a lubricating oil. The hairpin conductors may be radially or axially inserted depending upon the existence and size of any break in the bridge of rotor core 201 material at the outer peripheral surface 205 of the rotor core 201.

At slot position E, the slot 207 contains an arrangement of a permanent magnet 213 and an electrical conductor 211 radially inboard of the permanent magnet 213. A space 301 separates the permanent magnet 213 and the electrical conductor 211. The electrical conductor 211 is shown as a single conductive bar. The conductive bar may be any suitable conductor such as, but not limited to, copper, aluminum or brass. Conductive bars may be fabricated using any suitable process including, but not limited to, stamping, rolling, laser cutting, casting, extruding, etc. In the embodiment at slot position E, the conductive bar is solid. A closed channel 311 is formed in the rotor core 201 in the space 301 between the electrical conductor 211 and the permanent magnet 213. The closed channel 311 may provide a channel for circulating a pressurized coolant such as lubricating oil or air. The conductive bar and permanent magnets 213 may be radially or axially inserted depending upon the existence and size of any break in the bridge of rotor core 201 material at the outer peripheral surface 205 of the rotor core 201.

At slot position F, the slot 207 contains an arrangement of a permanent magnet 213 and an electrical conductor 211 radially inboard of the permanent magnet 213. A space 301 separates the permanent magnet 213 and the electrical conductor 211. The electrical conductor 211 is shown as a single conductive bar. The conductive bar may be any suitable conductor such as, but not limited to, copper, aluminum or brass. Conductive bars may be fabricated using any suitable process including, but not limited to, stamping, rolling, laser cutting, casting, extruding, etc. In the embodiment at slot position F, the conductive bar is solid. A closed channel 313 is disposed in the rotor core 201 in the space 301 between the electrical conductor 211 and the permanent magnet 213. The closed channel 313 may be a pipe or tube of any suitable cross section. The closed channel 313 may provide a channel for circulating a pressurized coolant such as lubricating oil or air. The conductive bar and permanent magnets 213 may be radially or axially inserted depending upon the existence and size of any break in the bridge of rotor core 201 material at the outer peripheral surface 205 of the rotor core 201.

At slot position G, the slot 207 contains an arrangement of a permanent magnet 213 and an electrical conductor 211 radially inboard of the permanent magnets 213. The permanent magnet 213 is shown as a first permanent magnet 213A and a second permanent magnet 213B. The first permanent magnet 213A is intermediate the second permanent magnet 213B and the electrical conductor 211. In an embodiment, the first permanent magnet 213A may have a first temperature rating that is less than the temperature rating of the second permanent magnet 213B. In an embodiment, the first permanent magnet 213A may have a first coercivity that is less than the coercivity of the second permanent magnet 213B. A space 301 separates the permanent magnet 213 and the electrical conductor 211. The electrical conductor 211 is shown as a single conductive bar. The conductive bar may be any suitable conductor such as, but not limited to, copper, aluminum or brass. Conductive bars may be fabricated using any suitable process including, but not limited to, stamping, rolling, laser cutting, casting, extruding, etc. In the embodiment at slot position G, the conductive bar is solid. The space 301 may be an air gap, or may be filled with an insulator such as, but not limited to, mineral wool or polyurethane. The space 301 may also provide a channel for circulating a pressurized coolant such as lubricating oil or air. The conductive bar and permanent magnets 213 may be radially or axially inserted depending upon the existence and size of any break in the bridge of rotor core 201 material at the outer peripheral surface 205 of the rotor core 201.

In FIG. 3B, adjacent sets of magnets 213 and electrical conductors 211 are labeled 325, 335, 345 and 355 for ease of referencing the diverse exemplary embodiments. The sets may correspond, for example, to pole pairs as found in interior permanent magnet rotors. The broken lines correspond to radii through the rotor core 201 corresponding to the general positional distribution of a permanent magnet 213 and electrical conductor 211 pair on one side of a set providing a pole pair as described. Slots 207 are illustrated including a respective space 301. Slots may be formed with ledges for support of the permanent magnets 213 and electrical conductors 211 as shown in exemplary embodiments of sets 325 and 335. Slots may be formed without ledges for support of the permanent magnets 213 and electrical conductors 211 as shown in exemplary embodiments of sets 345 and 355. The set 325 depicts a pair of magnets 213 that are radially skewed and a pair of electrical conductors 211 that are also radially skewed. In the set 325, the permanent magnet 213 and electrical conductor pairs are skewed by an equivalent angle. The set 335 depicts a pair of magnets 213 that are truly radially aligned and a pair of electrical conductors 211 that are radially skewed. The set 345 depicts a pair of magnets 213 that are radially skewed and a pair of electrical conductors 211 that are truly radially aligned. The set 355 depicts a pair of magnets 213 that are radially skewed and a pair of electrical conductors 211 that are also radially skewed. In the set 355, the permanent magnets 213 are skewed at a greater angle than the electrical conductors 211.

Figure 4:
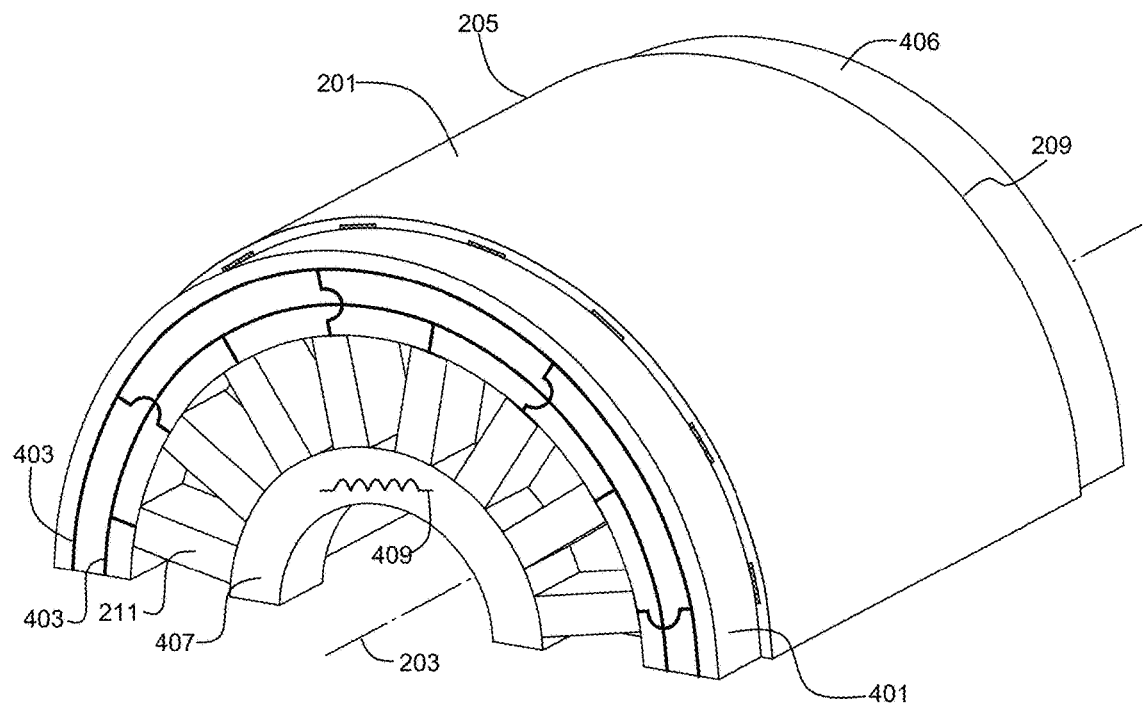
FIG. 4 illustrates various end features of a hybrid electric machine rotor, in accordance with one or more embodiments.

The HE rotary machine general embodiment of FIG. 2, wherein the electrical conductors 211 are continuous conductive bars through the axial length of the slots 207 and extend axially beyond the opposite ends 209 of the rotor core 201, is assumed for the purposes of the following description of the embodiments of FIG. 4. In an embodiment, an annular end ring assembly 401 may include two or more terminal conductors 403 for galvanically coupling to respective subsets of the conductive bars 211. The terminal conductors 403 may, for example, be implemented as copper end rings with radially extending features galvanically coupled to subsets of the conductive bars as schematically shown in FIG. 4. Such copper end rings may be stacked axially and separated by insulating rings. Permanent connection between the copper end rings and the conductive bars may be by way of soldering, brazing, laser welding, etc. The end ring assembly 401 is depicted as being radially outward of and surrounding the conductive bars though an alternative placement is illustrated as annular end ring assembly 407 which is surrounded by the conductive bars. In embodiments wherein the electrical conductors are hairpin conductors, the hairpin conductors may be pre-formed before insertion thus displacing the need for a conductive path end ring at one end of the rotor core. However, an end ring even at the pre-formed side may benefit from structural reinforcement of a non-conductive end ring assembly. In an embodiment, both placements of end ring assemblies 401 and 407 may be employed. The end ring assemblies may integrate a secondary coil 409 of a rotary transformer for providing electrical power to the electrical conductors 211 to produce a desired magnetic field response to current flow through the electrical conductors 211. A stationary primary winding (not shown) may inductively link electrical power to the secondary coil 409 in one or both of the end ring assemblies. Utilizing the end ring assembly 407 may advantageously support a more compact rotary transformer wherein the primary coil may be radially inward of the secondary coil 409. A similar end ring assembly 406 may be used on the opposing axial side of the rotor for shorting all electrical conductors 211 or separate subsets for addition flexibility and degrees of freedom.

Figure 5A:
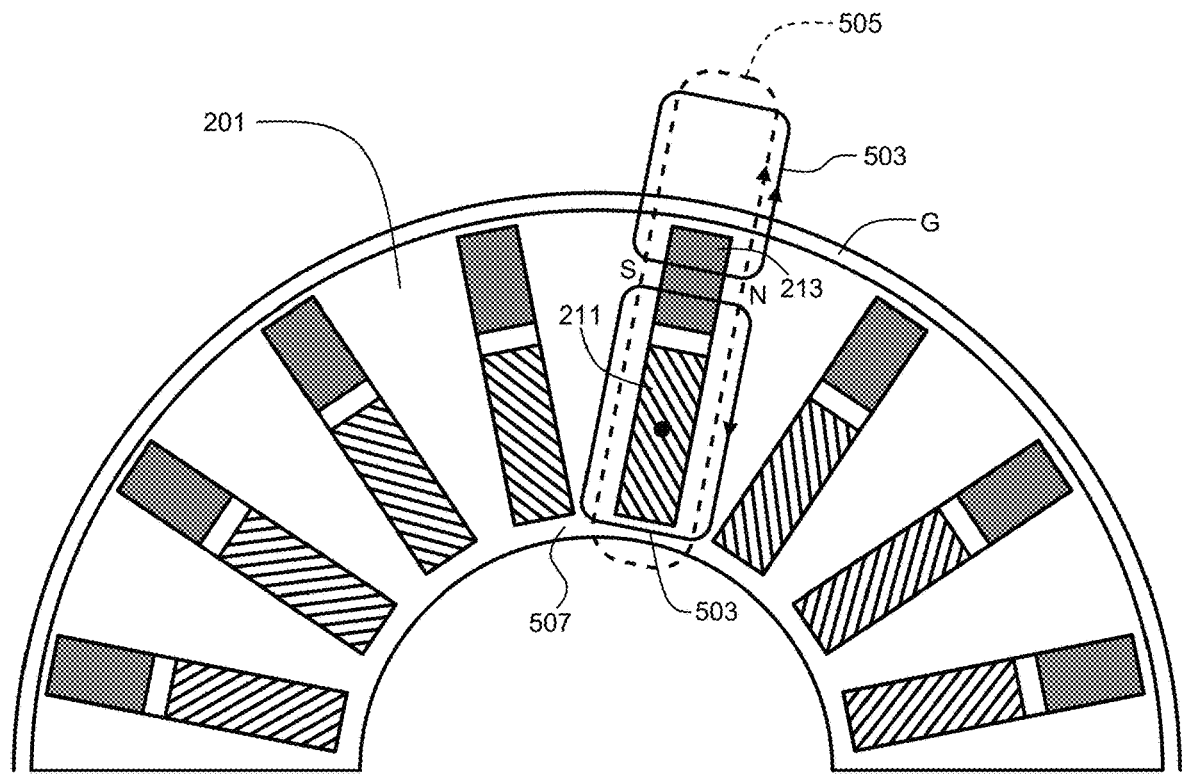
FIGS. 5A and 5B illustrate various magnetic operations of a hybrid electric machine rotor, in accordance with one or more embodiments.
Figure 5B:
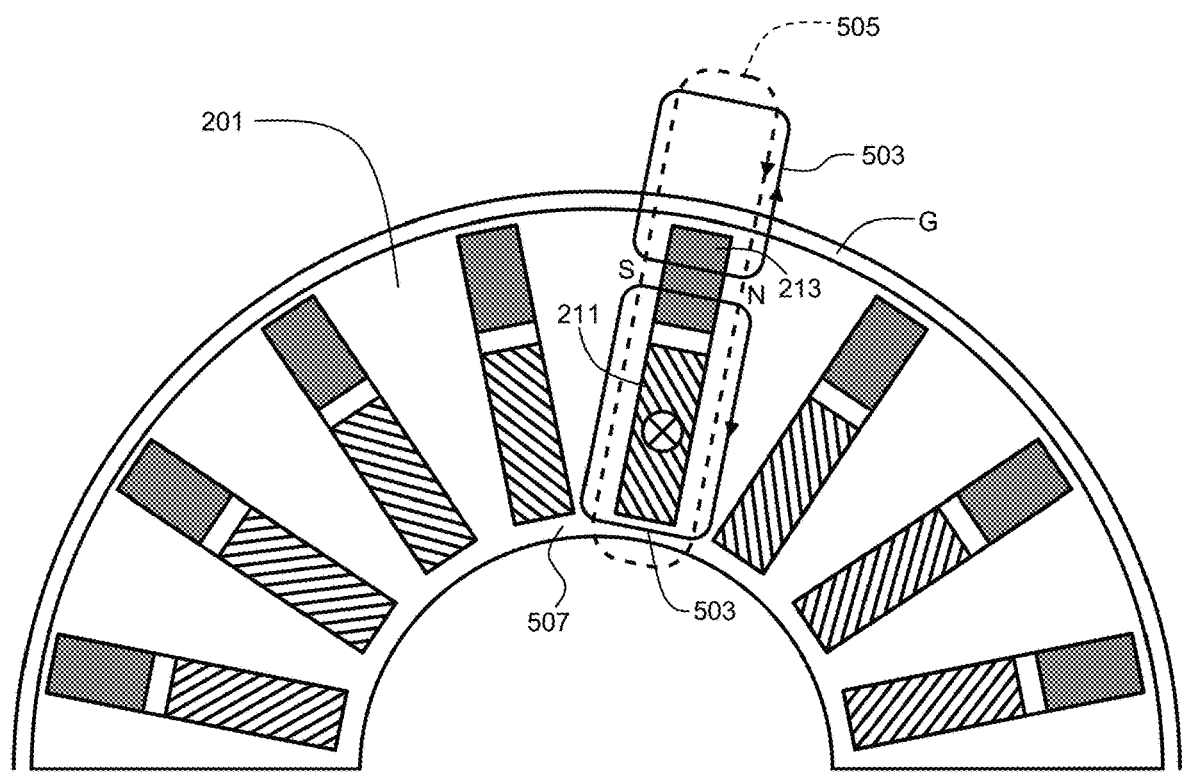

FIGS. 5A and 5B illustrate an exemplary rotor core 201 and a plurality of electrical conductors 211 and permanent magnets 213 as previously set forth herein. In the embodiment illustrated, the exemplary permanent magnet has north (N) and south (S) poles aligned circumferentially as shown. In operation, the magnetic field from the permanent magnets 213 include PM flux paths 503 between the magnetic poles including radially aligned components as illustrated. The radially aligned PM flux paths 503 may include radially outward paths cutting the air gap G and paths radially inward through the back iron 507 of the rotor core 201. The exemplary excited electrical conductor 211 may selectively carry current out of the page (FIG. 5A) or into the page (FIG. 5B) resulting in the electromagnetic (EM) field from the exemplary electrical conductor 211 shown in the EM flux paths 505 around the electrical conductors 211 in accordance with the right hand rule. In FIG. 5A, with current through the exemplary excited electrical conductor 211 out of the page, the EM field is in the same direction as the PM field in the air gap G resulting in a net magnetic field strengthening across the air gap G. In FIG. 5B, with current through the exemplary excited electrical conductor 211 into the page, the EM field is in the opposite direction as the PM field in the air gap G resulting in a net magnetic field weakening across the air gap G.

Figure 6:
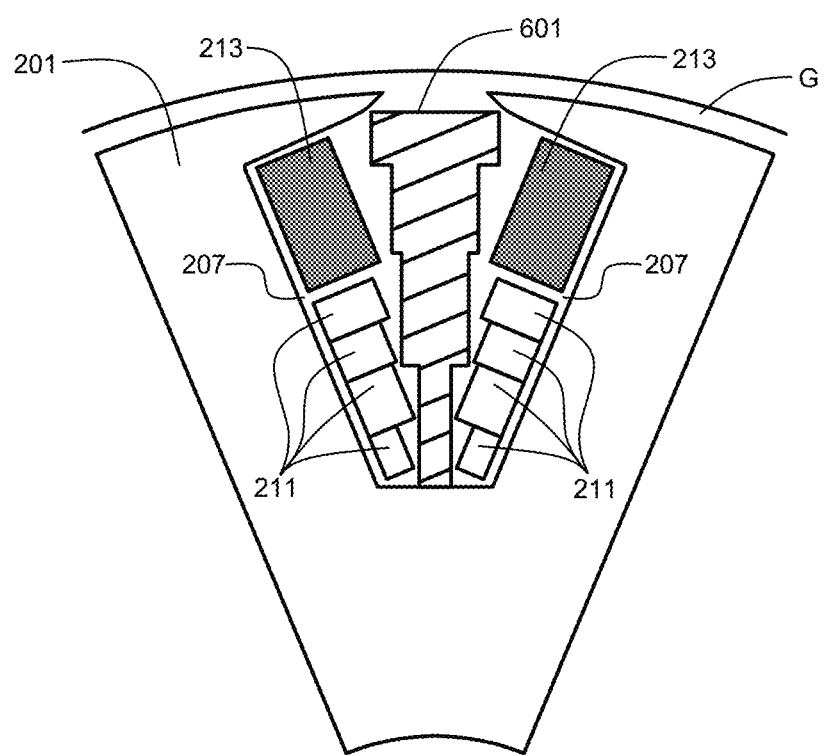
FIG. 6 illustrates alternative structure of a hybrid electric machine rotor, in accordance with one or more embodiments.

FIG. 6 illustrates an alternate embodiment of a rotor core 201 resembling a wound salient pole rotor. Slots 207 are depicted on each side of a separator 601 and defined between the separator 601 and the rotor core 201. As depicted, the slots 207 cross section may open up toward the air gap. Thus, to increase the fill factor, the slots 207 may contain multiple electrical conductors 211 of various cross sections. The electrical conductors may be bar stock including hairpin conductors or may be wound wire with the separator 601 providing a winding post. The permanent magnets 213 may have the poles aligned radially as depicted. The magnetic field in the air gap G may selectively be strengthened or weakened by the current direction through the electrical conductors 211. The permanent magnets 213 may be single piece rectangular cross section as illustrated or may be trapezoidal or multi-piece stacked of differing cross sections like the electrical conductors to improve the fill factor.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric machine, comprising:
   a stator; and
   a rotor core surrounded by the stator and rotatable about an axis, the rotor core having axially opposite ends and a plurality of slots, each slot extending through the rotor core between the axially opposite ends and containing at least one respective electrical conductor and at least one respective permanent magnet, wherein the electrical conductors are radially inboard relative to the permanent magnets and extend beyond the axially opposite ends of the rotor core,
   wherein the at least one respective permanent magnet contained within each slot comprises a respective first magnet and a respective second magnet, wherein the first magnets are intermediate the second magnets and the electrical conductors, and
   wherein the respective first magnet and the respective second magnet have at least one of a temperature rating and a coercivity that are different from one another,
   wherein the electrical conductors comprise conductive bars,
   wherein an annular end ring assembly at one end of the rotor core containing a first terminal conductor galvanically coupled to a first subset of the conductive bars and a second terminal conductor galvanically coupled to a second subset of the conductive bars, and
   wherein the annular end ring assembly further contains a secondary coil of a rotary transformer.

2. The electric machine of claim 1 wherein the conductive bars comprise hairpin conductors.

3. The electric machine of claim 1 wherein the at least one respective electrical conductor and the at least one respective permanent magnet contained within each slot are separated by a respective space.

4. The electric machine of claim 1 wherein the at least one respective permanent magnet contained within each slot comprises a stack of permanent magnets.

5. The electric machine of claim 1 wherein the first magnets have a first temperature rating and the second magnets have a second temperature rating that is less than the first temperature rating.

6. The electric machine of claim 1 wherein the first magnets have a first coercivity and the second magnets have a second coercivity that is less than the first coercivity.

7. The electric machine of claim 3 wherein the spaces separating the electrical conductors and the permanent magnets comprise cooling passages within the rotor core.

8. The electric machine of claim 3 wherein the spaces separating the electrical conductors and the permanent magnets contain a thermal insulator.

9. The electric machine of claim 1 wherein the conductive bars are hollow.

10. The electric machine of claim 1 wherein the slots are open at a periphery of the rotor core sufficient for radial insertion of the electrical conductors.

11. The electric machine of claim 10 further comprising a cylindrical containment sleeve surrounding the rotor core at a periphery of the rotor core.

12. The electric machine of claim 1 wherein the annular end ring assembly radially surrounds the conductive bars where they extend beyond the one end of the rotor core.

13. The electric machine of claim 1 wherein the annular end ring assembly is radially surrounded by the conductive bars where they extend beyond the one end of the rotor core.

14. An electric machine, comprising:
   a stator;
   a rotor core surrounded by the stator and rotatable about an axis, the rotor core having axially opposite ends and a plurality of slots, each slot extending through the rotor core between the axially opposite ends and containing at least one respective conductive bar and at least one respective permanent magnet, wherein the conductive bars are radially inboard relative to the permanent magnets and extend beyond the axially opposite ends of the rotor core, and wherein the at least one respective conductive bar and at the least one respective permanent magnet contained within each slot are separated by a respective space; and
   an annular end ring assembly at one end of the rotor core containing a first terminal conductor galvanically coupled to a first subset of the conductive bars and a second terminal conductor galvanically coupled to a second subset of the conductive bars,
   wherein the at least one respective permanent magnet contained within each slot comprises a respective first magnet and a respective second magnet, wherein the first magnets are intermediate the second magnets and the conductive bars,
   wherein the respective first magnet and the respective second magnet have at least one of a temperature rating and a coercivity that are different from one another, and
   wherein the annular end ring assembly further contains a secondary coil of a rotary transformer.

15. The electric machine of claim 14 wherein the first magnets have a first coercivity and the second magnets have a second coercivity that is less than the first coercivity.

16. An electrified powertrain for a vehicle, comprising:

a battery pack;
a traction power inverter module ("TPIM") connected to the battery pack, and configured to change a direct current ("DC") voltage from the battery pack to an alternating current ("AC") voltage; and
a rotary electric machine, comprising:
a stator energized by the AC voltage from the TPIM;
a rotor core surrounded by the stator and rotatable about an axis, the rotor core having axially opposite ends and a plurality of slots, each slot extending through the rotor core between the axially opposite ends and containing at least one respective conductive bar and at least one respective permanent magnet, wherein the conductive bars are radially inboard relative to the permanent magnets and extend beyond the axially opposite ends of the rotor core, and wherein the at least one respective conductive bar and at the least one respective permanent magnet contained within each slot are separated by a respective space; and
an annular end ring assembly at one end of the rotor core containing a first terminal conductor galvanically coupled to a first subset of the conductive bars and a second terminal conductor galvanically coupled to a second subset of the conductive bars, the annular end ring assembly further containing a secondary coil of a rotary transformer for energizing the conductive bars;
a rotor shaft connected to the rotor, and configured to rotate about an axis of rotation in conjunction with the rotor when the stator is energized; and
a transmission coupled to the rotor shaft and powered by the electric machine.

* * * * *